United States Patent [19]

McClish et al.

[11] Patent Number: 5,559,705
[45] Date of Patent: Sep. 24, 1996

[54] ADAPTIVE PROFILE CORRECTION FOR ROTATING POSITION ENCODERS IN RECIPROCATING ENGINES

[75] Inventors: Michael A. McClish, Northville; Steven L. Plee, Brighton; Donald J. Remboski, Jr., Dearborn; Marvin L. Lynch, Detroit; Susan K. Sonday, Dearborn, all of Mich.

[73] Assignee: Motorola, Inc., Schaumburg, Ill.

[21] Appl. No.: 383,119

[22] Filed: Feb. 3, 1995

[51] Int. Cl.$^6$ ................................. G06G 7/70; G01P 3/42
[52] U.S. Cl. ............................ 364/431.07; 364/431.03; 324/160; 73/117.3; 123/419; 123/436
[58] Field of Search ..................... 364/431.07, 431.08, 364/508, 726, 431.05, 431.02, 426.04, 431.01, 566, 567; 73/117.3, 116; 123/682, 492, 493, 415, 419, 436, 488, 494; 60/603, 602; 324/160–175

[56] References Cited

U.S. PATENT DOCUMENTS

| | | | |
|---|---|---|---|
| 4,347,571 | 8/1982 | Leung et al. | 364/431.08 |
| 5,144,560 | 9/1992 | Kurihara et al. | 364/431.01 |
| 5,222,022 | 6/1993 | Adams et al. | 364/431.07 |
| 5,305,220 | 4/1994 | Schöggl | 364/431.07 |
| 5,327,360 | 7/1994 | Poisson | 364/431.01 |
| 5,359,518 | 10/1994 | Wimmer | 364/431.01 |
| 5,377,537 | 1/1995 | James | 73/117.3 |

OTHER PUBLICATIONS

Anders Unger and Kent Smith, The Obdii System in the Volvo 850 Turbo Oct. 18–21, 1993 SAE932665.

Martin Klenk, Winifred Moser, Werner Mueller, and Wolfgang Wimmer, Misfire Detection by Evaluating Crankshaft Speed—A Means to Comply With Obdii SAE30399 Jan. 1994.

*Primary Examiner*—Kevin J. Teska
*Assistant Examiner*—Jacques Louis-Jacques
*Attorney, Agent, or Firm*—Nicholas C. Hopman

[57] ABSTRACT

A method and apparatus for adaptive profile correction for rotating position encoders in reciprocating engines measures a raw engine speed derived from a rotating position encoder (107) driven by a reciprocating engine. A first corrected engine speed (1103) is provided dependent on the raw engine speed and a predetermined first encoder profile while the engine is operating bounded within a first speed range (905), and a second corrected engine speed (1103) is provided dependent on the raw engine speed and a predetermined second encoder profile while the engine is operating bounded within a second speed range (913).

15 Claims, 7 Drawing Sheets

ADAPTIVE PROFILE CORRECTION FOR ROTATING POSITION ENCODERS IN RECIPROCATING ENGINES

FIELD OF THE INVENTION

This invention is generally directed to the field of reciprocating engine controls, and specifically for compensating for profile errors associated with an encoder indicating engine rotational position and used to derive and engine speed signature.

BACKGROUND OF THE INVENTION

Figure 1:
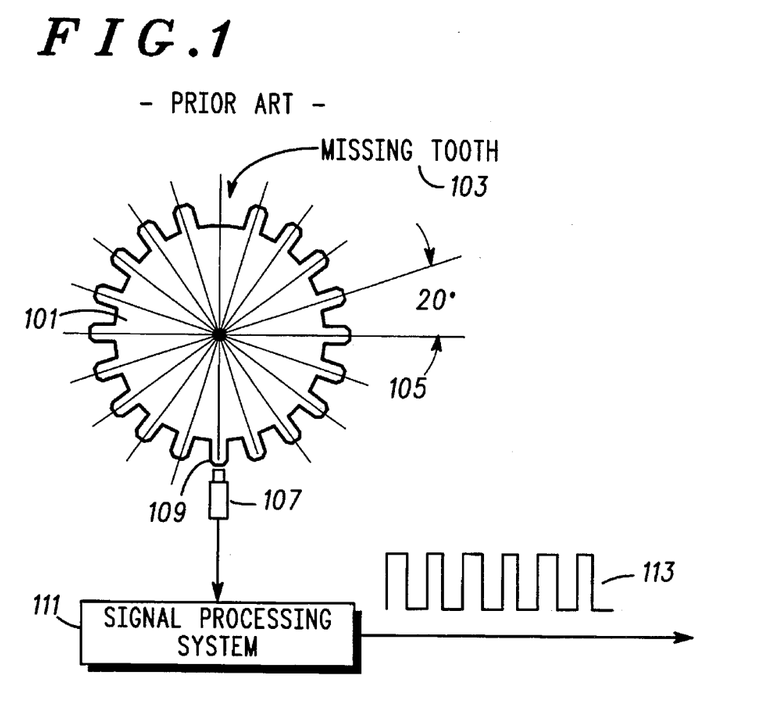
FIG. 1 is a schematic drawing of a prior art digitized target based rotating encoder system.

Contemporary reciprocating engine systems typically employ an encoder system to determine absolute rotary position of an engine. From this absolute rotary position measurement an engine speed signature can be derived. An example of this type of approach is illustrated in FIG. 1. A wheel 101 has teeth, or positional markers 109 disposed radially on an edge of the wheel 101. The wheel 101 is coupled to a crankshaft of the engine and rotates as the crankshaft rotates. In one approach a tooth is missing on the wheel 101 to indicate a fixed absolute position of the wheel. This missing tooth 103 marker is used to synchronize the control of the engine dependent on this fixed position. Teeth 109 on the wheel are positioned a meaningful distance apart—here 20°. An encoder, or position sensor 107 is positioned across from the wheel 101 and is used to sense the teeth 109 as the wheel 101 rotates driven by the engine's combustion process. A signal processing system 111 interprets an output of the encoder 107 and provides a signal 113 indicative of the absolute position of the engine.

Unfortunately, an engine speed signature derived from a digitized target based rotating encoder system has undesirable or erroneous behaviors built into it. Errors include those caused by an error in the physical placement in terms of spacing and/or width of the target teeth measured along a radial axis. If these targets are positioned nonuniformly they can contribute to cause an erroneous representation of true engine position—thus speed. This source of error is typically speed independent. An illustration of a source of this position related error is shown in FIG. 2.

Figure 2:
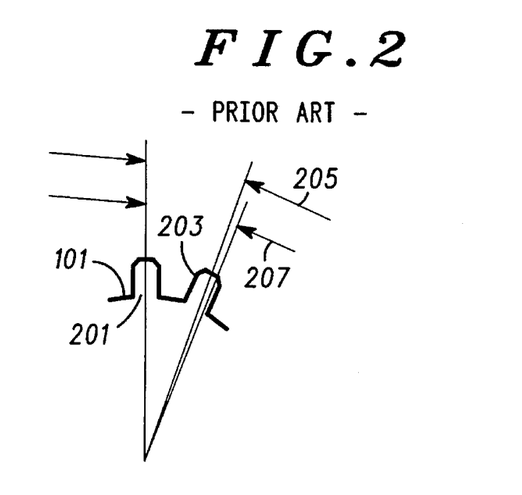
FIG. 2 is an illustration showing details of the digitized target introduced in FIG. 1.

In FIG. 2 the wheel 101 has a first tooth 201 and a second tooth 203 positioned apart from the first tooth 201. Ideally, the position of the second tooth 203, relative to the first tooth 201 is indicated by an angular displacement shown at reference number 207. In this case the angular displacement is too small and is represented by reference number 205. Because of the error associated with the displacement shown by reference number 205 the encoder 107 will produce an erroneous result. This is unfortunate because some combustion misfire systems must rely on an accurate engine speed signature to accurately determine a combustion misfiring event.

Other undesirable behaviors comprise; a speed dependent error associated with a magnetic reaction between a variable reluctance sensor's (used as the encoder 107) housing and a relatively large air-gap associated with the missing tooth 103; and speed dependent dynamic engine effects such as those attributable to piston imbalance and crankshaft twist.

Identified prior art approaches compensated for the encoder profile errors by using a singular profile. This is inadequate because of the dynamic behavior of the encoder profile error over the operating speed range of the engine. Furthermore the known prior art approaches acquired the profile under non-fueled conditions. This approach was taken to assure that errors in encoder position—thus speed measurement associated with a misfiring combustion process. Additionally, these prior art schemes could not safely de-fuel the engine running at high speed, particularly at high load, because it posed a safety hazard or unacceptable driveability behaviors. Because of this the associated misfire detection system had to be disabled at high engine speeds because the encoder profile correction was inadequate to improve the signal fidelity enough to reliably detect misfiring. This is because engine combustion misfire detection systems that used the single profile correction scheme were incapable of distinguishing a misfire from the background noise in the encoder derived engine speed signal at high engine speeds.

Figure 3:
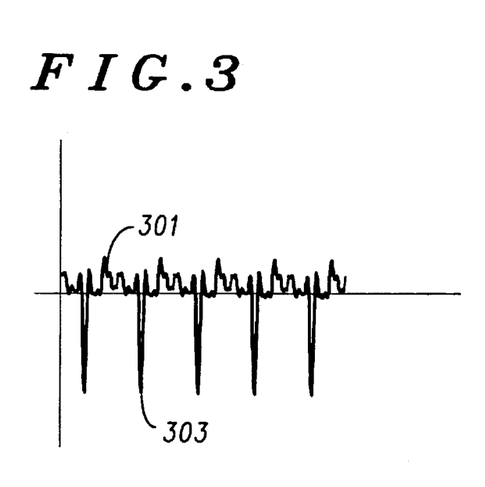
FIG. 3 is a chart showing a high fidelity combustion torque dependent acceleration waveform over many engine cycles with a 1-in-25-cylinder induced misfire event.

FIG. 3 is a chart illustrating a high fidelity combustion torque dependent acceleration waveform over many engine cycles with a 1-in-25-cylinder induced misfire event. The acceleration waveform is derived from velocity data as the engine crankshaft rotates. This waveform has minimal encoder profile errors in it. The main part of the waveform 301 represents a noise portion and the strong negative going portion 303 represents the induced misfire. This waveform is considered relatively high fidelity because an amplitude of the noise portion is significantly smaller than an amplitude of the strong negative going portion 303 and thus the portions 301 and 303 are easily distinguishable.

Figure 4:
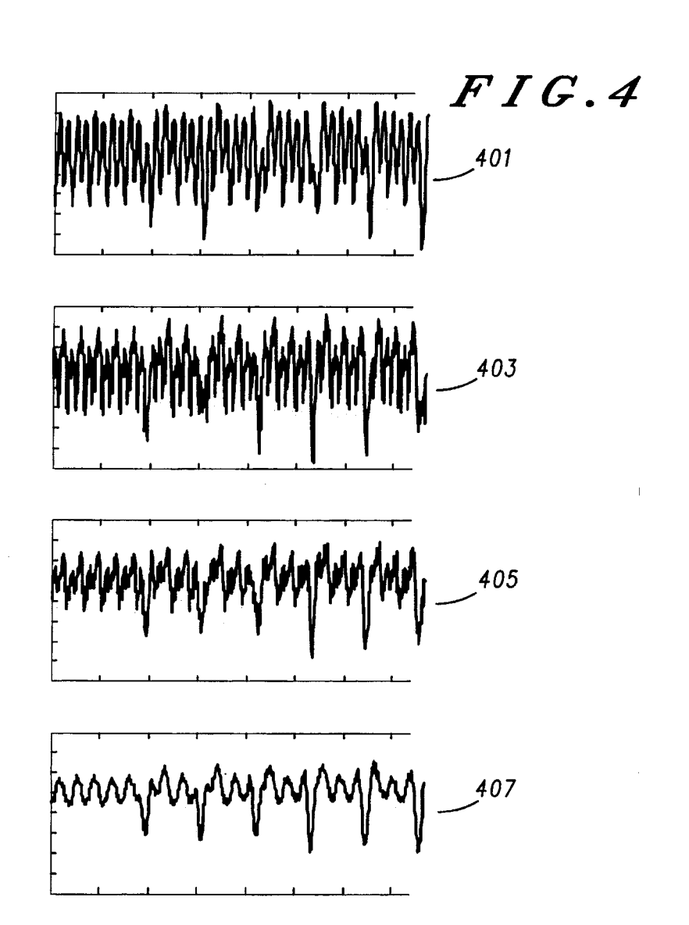
FIGS 4A–4B are charts illustrating combustion torque dependent acceleration waveforms at 6,000 RPM with a 1-in-25-cylinder induced misfire event.

FIGS. 4A–4D are charts illustrating combustion torque dependent acceleration waveforms at 6,000 RPM with a 1-in-25-cylinder induced misfire event. FIG. 4A shows an example of a combustion torque dependent acceleration waveform without the benefit of any encoder profile correction. Comparing this to the waveform in FIG. 3 it can be readily appreciated that the 1-in-25-cylinder induced misfire events are masked by systemic noise related to the various causes of error introduced above.

Figure 5:
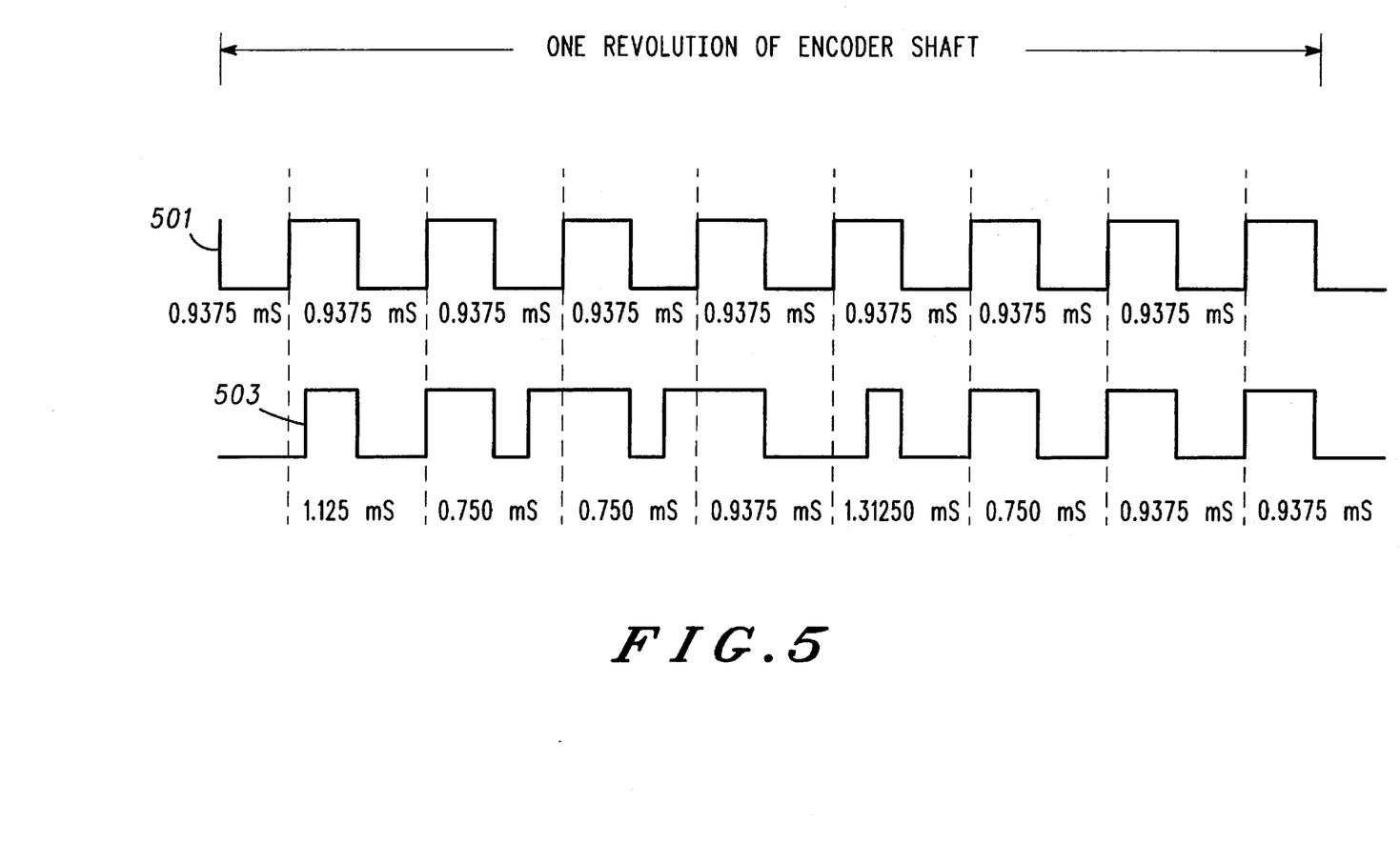

FIGS. 5A and 5B show timing diagrams illustrating engine speed variability dependent on encoder profile error. FIG. 5A shows an encoder output at a fixed shaft RPM with an ideal waveform. FIG 5B shows an encoder output at the same fixed shaft RPM, but having a profile. In this case downward-going edges are not perfectly monotonic. Shaft speed calculated from one downward-going edge to the next will be inaccurate due to the encoder profile errors.

What is needed is an improved approach for encoder profile correction for rotating position encoders in reciprocating engines that eliminates the various erroneous behaviors associated with such encoders.

BRIEF DESCRIPTION OF THE DRAWINGS

FIGS. 5A an 5B are timing diagrams showing engine speed variability dependent on encoder profile error;

DETAILED DESCRIPTION OF A PREFERRED EMBODIMENT

A method and apparatus for adaptive profile correction for rotating position encoders in reciprocating engines corrects profile errors of an encoder over several engine speed ranges using multiple encoder profiles. This yields a higher fidelity engine combustion behavior signal to be used for applications such as misfire detection. This approach yields particularly good misfire detection results at high engine speeds where other approaches fail miserably and must be shut off so that false misfire indications are not given.

Essentially, the subject invention learns the encoder system's speed signature, or profile, while the engine is fueled over a wide operating speed range and stores it. Later, this learned profile or behavior is eliminated from a subsequently acquired engine speed signature to reduce periodically erroneous behaviors caused by the encoder profile error, and does so over multiple engine speed rages. The approach of applying multiple encoder profiles over multiple engine speed ranges is not only a significant departure from prior art approaches but offers significant performance advantages as well. This approach affords a much higher fidelity result over the engine's wide speed operating range than prior art approaches. For instance, using the disclosed approach, the fidelity of the engine speed signal can be improved enough to detect combustion misfires at high engine speeds that has not been demonstrated with prior art schemes.

Also key in the new approach, is the acquisition of encoder profiles during engine fueling rather than during a de-fueled condition. Note that the approach described in the preferred embodiment allows fueled acquisition, but it really does not mandate it. Alternatively, multiple profiles could be stored based on higher RPM decels. Acquiring the speed profile under a fueled condition results in a more accurate encoder profile and ultimately in a higher fidelity signal representative of engine combustion torque in terms of engine velocity and/or acceleration. Again, this is a significant departure and advantage over prior art schemes that required de-fueling the engine. One disadvantage of prior art schemes is that they could not de-fuel an engine running a high speed, particularly at high load, because it posed a safety hazard. Unfortunately, prior art schemes measured engine-position profiles at a singular engine speed that varies during an un-fueled decel. Furthermore, the prior art schemes measured engine-position profiles at mid to low engine speeds rather than at higher engine speeds where the dynamic engine behaviors can cause the most problems in the encoder profile. Acquisition of encoder profiles during engine fueling will be detailed after a discussion of why it is necessary to correct for encoder profile errors over multiple speed ranges. FIGS. 1–5 were introduced in the Background section. The preferred embodiment will be better understood with reference to these and the remaining figures.

FIG. 4B illustrates combustion torque dependent acceleration waveform at 6,000 RPM with a 1-in-25-cylinder induced misfire event that has been modified by an encoder profile acquired at an engine speed of 2,000 RPM. FIG. 4C illustrates combustion torque dependent acceleration waveform at 6,000 RPM with a 1-in-25-cylinder induced misfire event that has been modified by an encoder profile acquired at an engine speed of 4,000 RPM. And, FIG. 4D illustrates combustion torque dependent acceleration waveform at 6,000 RPM with a 1-in-25-cylinder induced misfire event that has been modified by an encoder profile acquired at an engine speed of 6000 RPM. Clearly FIG. 4D has the highest fidelity. So to produce the highest fidelity acceleration signal with an engine speed of 6,000 RPM an encoder profile acquired at an engine speed of 6000 RPM should be used. Applying an encoder profile acquired at an engine speed of 4,000 RPM and 2,000 RPM when operating at an engine speed of 6,000 RPM can result in less than optimal results.

Figure 6:
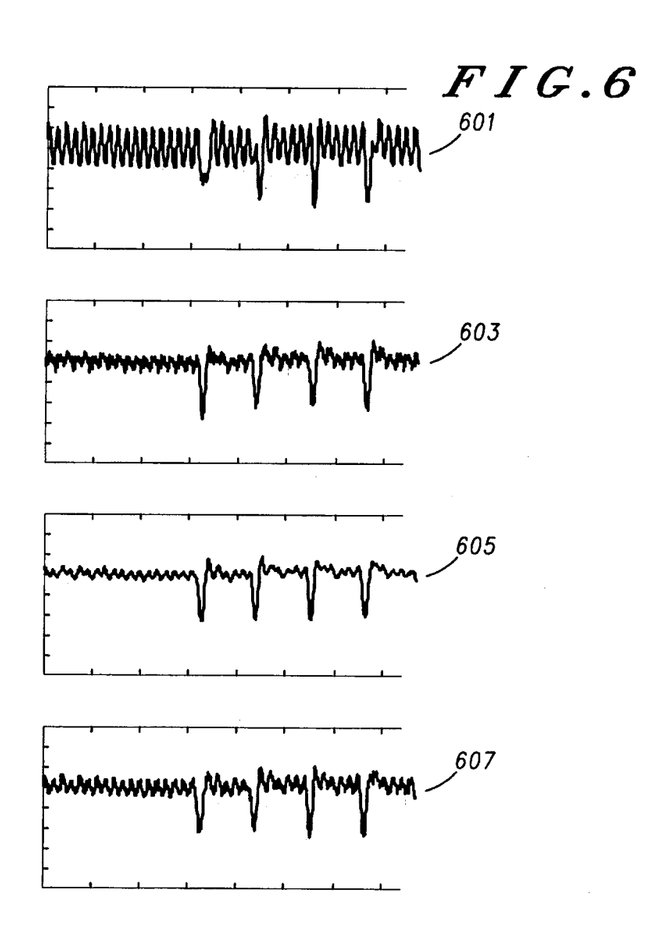
FIGS. 6A–6D are charts illustrating combustion torque dependent acceleration waveforms at 4,000 RPM with a 1-in-25-cylinder induced misfire event.

In FIG. 6B, a waveform illustrates combustion torque dependent acceleration waveform at 4,000 RPM with a 1-in-25-cylinder induced misfire event that has been modified by an encoder profile acquired at an engine speed of 2,000 RPM. In FIG. 6C, a waveform illustrates combustion torque dependent acceleration waveform at 4,000 RPM with a 1-in-25-cylinder induced misfire event that has been modified by an encoder profile acquired at an engine speed of 4,000 RPM. And, in FIG. 6D, a waveform illustrates combustion torque dependent acceleration waveform at 4,000 RPM with a 1-in-25-cylinder induced misfire event that has been modified by an encoder profile acquired at an engine speed of 6000 RPM. Clearly FIG. 6C has the highest fidelity. So to produce the highest fidelity acceleration signal with an engine speed of 4,000 RPM an encoder profile acquired at an engine speed of 4,000 RPM should be used. Applying an encoder profile acquired at an engine speed of 2,000 RPM and 6000 RPM when operating at an engine speed of 4,000 RPM can result in less than optimal results.

Figure 7:
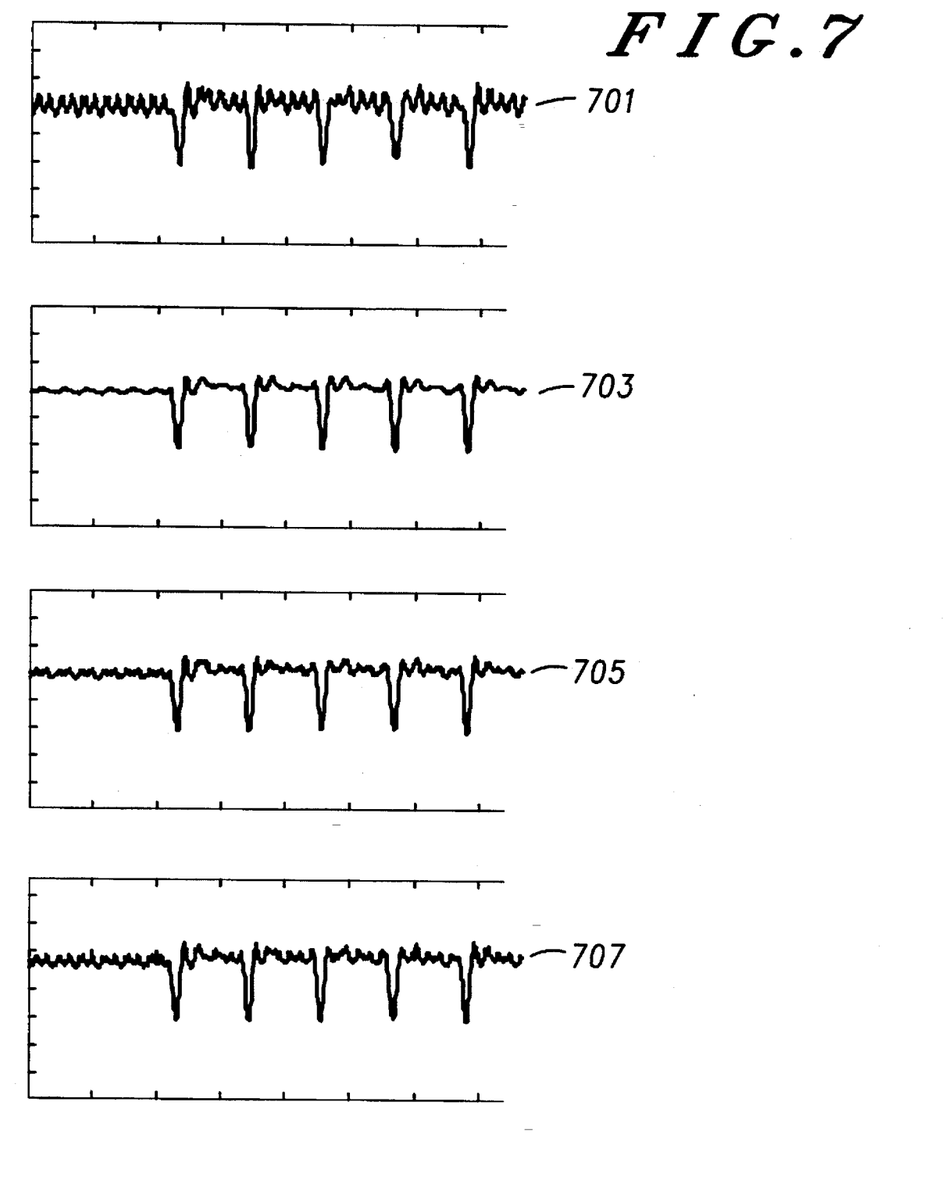
FIGS. 7A–7D are charts showing combustion torque dependent acceleration waveforms at 2,000 RPM with a 1-in-25-cylinder induced misfire event.

In FIG. 7B, waveform illustrates combustion torque dependent acceleration waveform at 2,000 RPM with a 1-in-25-cylinder induced misfire event that has been modified by an encoder profile acquired at an engine speed of 2,000 RPM. In FIG. 7C, a waveform illustrates combustion torque dependent acceleration waveform at 2,000 RPM with a 1-in-25-cylinder induced misfire event that has been modified by an encoder profile acquired at an engine speed of 4,000 RPM. In FIG. 7D, a waveform illustrates combustion torque dependent acceleration waveform at 2,000 RPM with a 1-in-25-cylinder induced misfire event that has been modified by an encoder profile acquired at an engine speed of 6000 RPM. Clearly FIG. 7D has the highest fidelity. So to produce the highest fidelity acceleration signal with an engine speed of 2,000 RPM an encoder profile acquired at an engine speed of 2,000 RPM should be used. Applying an encoder profile acquired at an engine speed of 4,000 RPM and 6000 RPM when operating at an engine speed of 2,000 RPM can result in less than optimal results.

It should be manifestly clear from the above explanation that to achieve a good signal fidelity over a full range of engine speed conditions more than one encoder profile should be used. Furthermore, prior art schemes make the assumption that the encoder profile is due to "hard" errors in the encoder and is fixed as a fraction of the ideal period time.

An example of this is a misplaced tooth on a gear-type encoder. With this assumption, a single set of high quality profile correction factors can be used at any shaft RPM. However, if dynamic conditions affect the instantaneous profile, then a single set of correction factors lose their effectiveness as the current conditions diverge from those conditions under which the original profile was acquired. Also, prior art schemes have chosen not to fuel the engine while acquiring an encoder profile because in order to prevent the tainting of the acquired encoder profile by an undetected combustion misfire event. This prior art scheme restricts the encoder profile acquisition to a very limited speed range. To acquire and use multiple encoder profiles, the engine may be operated in a steady-state fueled condition at a relatively fixed speed - while no misfires are occurring. Next the acquisition of multiple encoder profiles in a fueled engine will be detailed.

In the preferred embodiment a bootstrapping approach is used to acquire multiple encoder profiles while operating under a steady-state fueled engine operating condition. The bootstrap method relies on a approach that an encoder profile derived while the engine is operating in a lower speed can be used to improve fidelity of a misfire detection and gating mechanism while the engine is operating in a just-higher speed range. The bootstrap approach enables encoder profile acquisition at higher engine speeds because true misfires are more accurately detected with the improved signal fidelity inherent in this approach. This increased capability allows acquisition of an encoder profile at the just-higher speed range while ensuring misfires are not occuring.

As described above, a misfire determination process is used to gate off an encoder profile acquisition if a misfire is determined. Preferably, the misfire detection process includes the determination of a misfiring condition dependent on a measured engine crankshaft acceleration which is a function of engine crankshaft rotational speed as measured by the encoder system. Unfortunately, using engine acceleration, a derivative function, can be tricky because of the poor signal fidelity as engine speed increases. This can be clearly seen in FIG. 4A which has extremely poor signal fidelity while the engine is operating at a speed of 6000 RPM. In FIG. 6A the signal fidelity is also poor but somewhat better than in FIG. 4A. Without further signal fidelity improvement the misfire behavior cannot be distinguished from other noise and ordinary combustion behavior. This means that multiple speed encoder profile acquisition cannot take place until a higher fidelity engine acceleration signal can be used to determine combustion misfire behavior in order to gate off the profile acquisition process.

To accomplish the acquisition of encoder profiles under fueled conditions the above-mentioned bootstrapping approach must ensure that a misfire is not tainting the encoder profile acquisition. Whereas prior art schemes used de-fueling to ensure that misfires were not occurring, the present approach ensures that misfires are not occurring based on a determination of whether or not a processed acceleration signal, dependent on raw engine speed derived from a rotating position encoder, exceeds a threshold. If the processed acceleration signal exceeds the threshold, then a misfire has been detected and the encoder profile acquisition is disabled or gated off. During the multiple encoder profile acquisition the processed acceleration signal is derived dependent on certain lower engine speed encoder profiles. For instance if the system is acquiring an encoder profile at a certain engine speed then the processed acceleration signal is derived using an encoder profile earlier derived for a lower engine speed. This approach cleans-up the processed acceleration signal significantly such that noise doesn't indicate a misfire and shut down the encoder profile acquisition process for the current speed range. Said another way, the bootstrapping approach improves the engine acceleration signal fidelity to the point where it can be reliably used to gate off the encoder profile acquisition process even at higher engindge speeds. Furthermore, this approach allows enough capability to detect a true misfire and shut down the acquisition process if necessary.

FIGS. 8, 9, 10, and 11 are flow charts showing various method steps in accordance with the preferred embodiment of the invention. The method steps in FIG. 8, 9, 10, and 11 are executed on the system shown in FIG. 12 which will be described next. FIG. 12 is a system block diagram illustrating an apparatus for executing the preferred method. A microcontroller 1205 can be constructed using various common computer components. Preferably, a Motorola MC68HC332 microcontroller is used. The MC68HC332 microcontroller is complemented by EPROM or Electrically Programmable Read Only Memory which is used to store native MC68HC332 code representative of the method steps shown in FIGS. 8, 9, 10, and 11. The microcontroller 1205 also comprises temporary memory in the form of RAM or Random Access Memory for temporary storage of variables. Furthermore the MC68HC332 microcontroller has facility to measure the output signal of the position sensor 107. The microcontroller 1205 derives a processed acceleration signal 1207 dependent on the measured engine speed and provides it to an external acceleration based misfire detection system 1201. Alternatively, the external acceleration based misfire detection system 1201 can be integrated into the microcontroller 1205. Derivation of the processed acceleration signal 1207 will be detailed later. The misfire detection system 1201 provides a misfire indication 1203 back to the microcontroller 1205 if a combustion misfire behavior is detected in the processed acceleration signal 1207. As mentioned above the detection of combustion misfire behavior is used to turn off the encoder profile acquisition process.

Figure 8:
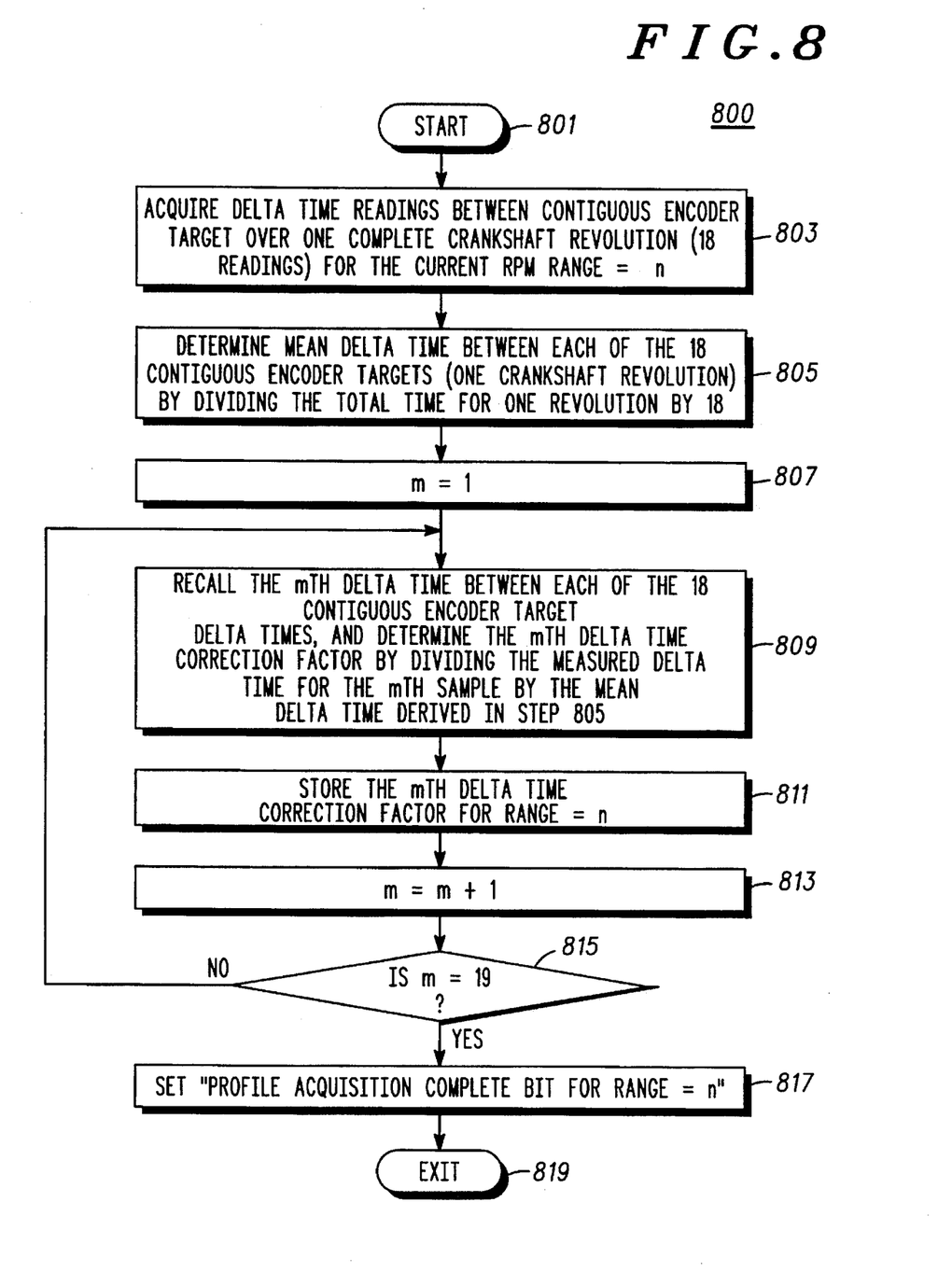
FIG. 8 is a flow chart illustrating various method steps in accordance with a preferred embodiment of the invention.

Next, in FIG. 8 a multiple speed range encoder profile model is acquired. Note that a routine 900 shown in FIG. 9 operates simultaneously with a routine 800 shown in FIG. 8 and is used to determine which speed range the engine is operating in and will be detailed later. The routine 800 is executed either once during an engine calibration process or periodically to update the encoder profile model. This is done by acquiring and storing a new set of profile correction factors. As mentioned above, at higher engine speeds the dynamic engine behaviors can cause the processed acceleration to have some characteristics similar to a true misfire. Because of this phenomena, an encoder profile is acquired commencing at a relatively low engine speed first where dynamic engine behaviors effect the speed signal the least. This acquired encoder profile is subtracted from the actual encoder profile and a processed (cleaned up—or more meaningful fidelity) engine speed signal is submitted to a misfire detection mechanism. Through the application of multiple encoder profiles, each one's acquisition and use limited to a range of engine speed, the processed engine speed signal incrementally becomes free of the undesirable dynamic engine behaviors, and the misfire threshold is not exceeded by the processed acceleration waveform until a true misfire occurs. If a misfire is detected by the misfire detection system, then the profile acquisition process is shut down. The described approach assumes that one revolution has no RPM change. It is incumbent upon the user to ensure that data to generate an encoder profile is acquired at an appropriate time, such as when no misfires are occurring.

The microcontroller 1205 starts execution of routine 800 at a start step 801.

Figure 9:
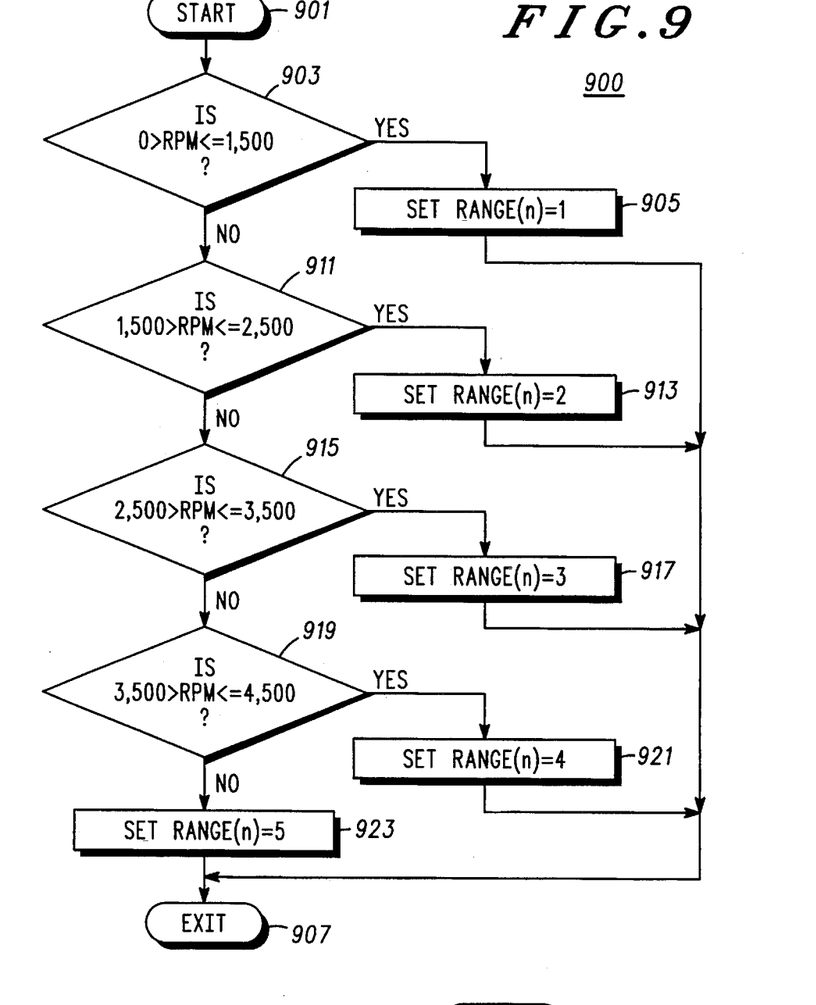
FIG. 9 is a flow chart showing various method steps in accordance with the preferred embodiment of the invention.

Next, in step 803 the microcontroller 1205 acquires and temporarily stores raw delta time readings between contiguous encoder target over one complete crankshaft revolution (here 18 readings) for the current RPM range=n as determined in routine 900. The delta time readings are acquired by measuring times between the successive targets or teeth on the wheel 101.

Next, in step 805 a mean delta or ideal time between each of the 18 contiguous encoder targets is computed by summing the delta times over one revolution and dividing by the number of delta times in one revolution. The following deterministic equation may be used to do this.

EQUATION 1

$$ideal\_delta\_time = \frac{\sum\limits_{1}^{m} encoder\_target\_delta\_time}{18}$$

where: m is the current encoder target

In a next step 807, an index variable m is set to an initial condition of 1. Here the index m is used to keep track of which encoder target time is being processed.

Then, in step 809 each measured (actual) delta time is divided by the ideal delta time over the revolution to assign a correction factor for the mth encoder target time in the nth range. This is accomplished by recalling the mth delta time between each of the 18 contiguous encoder target delta times, and determine the mth delta time correction factor by dividing the measured delta time for the mth sample by the mean delta time derived in step 805. A deterministic equation for this process is shown next.

EQUATION 2

$$\text{Corrected period}_{(m)} = \text{Measured period}_{(m)} \cdot \text{Correction Factor for that period}_{(m)}$$

where:

m is the period of interest.

An example of results from the above equation are shown next in CHART 1 for the profile acquired and shown in FIG. 5B.

CHART 1

| MEASURED PERIOD | CORRECTION FACTOR | CORRECTED PERIOD |
|---|---|---|
| 1.1250 | 0.8333 | 0.9375 |
| 0.7500 | 1.2500 | 0.9375 |
| 0.7500 | 1.2500 | 0.9375 |
| 0.9375 | 1.0000 | 0.9375 |
| 1.3125 | 0.7143 | 0.9375 |
| 0.7500 | 1.2500 | 0.9375 |
| 0.9375 | 1.0000 | 0.9375 |
| 0.9375 | 1.0000 | 0.9375 |
| 0.9375 | ←(ideal_delta_time) | |

In step 811 the just-determined correction factor corresponding to the mth encoder target in the nth speed range is stored in the new encoder profile model.

Next, in step 813 the encoder target index variable m is incremented to point to the next encoder target.

Then, in step 815 a test is made to ensure that all of the encoder target corrections factors have been processed. If they haven't then steps 809, 811, 813, and 819 are iterated until a complete encoder profile model has been acquired and processed for speed range=n. If m=19 in step 815 then step 817 is executed.

Next, in step 817 a profile acquisition complete bit is set to indicate that a profile has been completely acquired and processed for engine speed range n. Then, the routine 800 is exited in step 819. When the engine is operating within a new speed range the routine 800 is recalled and an encoder profile will be acquired and process for that speed range while no misfires are occurring as indicated by the misfire indication 1205 in the system shown in FIG. 12. Next the engine speed range method will be described with reference to FIG. 9.

In FIG. 9 a routine 900 commences at a start step 901. This routine 900 runs continuously and is used by above described routine 800 and later described routine 1000. In a next step 903 the engine speed is measured by monitoring the output of the encoder 107. If the engine is operating at a speed between 0 (zero) and 1,500 RPM then step 905 is executed. In step 905 a range flag is set to range 1 and the routine 900 is exited at step 907.

If the engine is not operating at a speed between 0 and 1,500 RPM, then step 911 is executed.

In step 911 the engine speed is measured by monitoring the output of the encoder 107. If the engine is operating at a speed between 1,500 RPM and 2,500 RPM then step 913 is executed. In step 913 the range flag is set to range 2 and the routine 900 is exited at step 907.

If the engine is not operating at a speed between 1,500 RPM and 2,500 RPM, then step 915 is executed.

In step 915 the engine speed is measured by monitoring the output of the encoder 107. If the engine is operating at a speed between 2,500 RPM and 3,500 RPM then step 917 is executed. In step 917 the range flag is set to range 3 and the routine 900 is exited at step 907.

If the engine is not operating at a speed between 2,500 RPM and 3,500 RPM, then step 919 is executed.

In step 919 the engine speed is measured by monitoring the output of the encoder 107. If the engine is operating at a speed between 3,500 RPM and 4,500 RPM then step 921 is executed. In step 921 the range flag is set to range 4 and the routine 900 is exited at step 907.

If the engine is not operating at a speed between 3,500 RPM and 4500 RPM, then step 929 is executed. In step 929 the range flag is set to range 5 and the routine 900 is exited at step 907. Next, FIG. 10 will be described.

Figure 10:
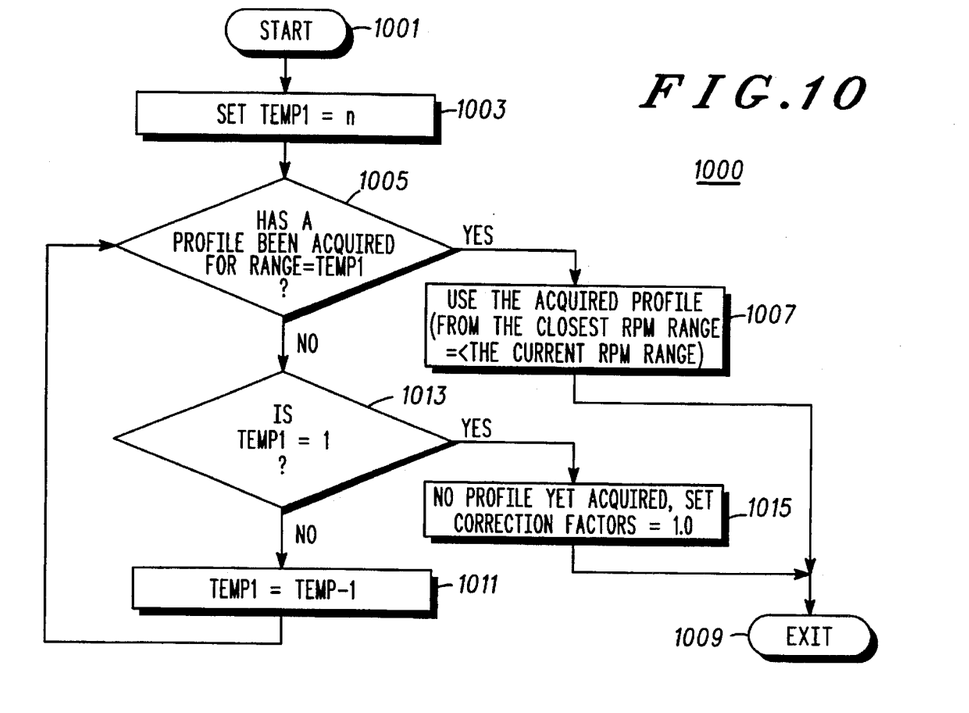
FIG. 10 is a flow chart illustrating various method steps in accordance with the preferred embodiment of the invention.

In FIG. 10 a routine 1000 runs continuously and is used to determine whether or not a profile has been acquired and processed for a particular engine speed range. The routine 1000 commences at step 1001.

In step 1003 a temporary variable TEMP1 is set to the range variable n supplied by routine 900.

Next, in step 1005 a test is made to determine whether or not a profile has been acquired and processed for the engine speed range n represented by the variable TEMP1. If a profile has been acquired and processed for the engine speed range n then step 1007 is executed. In step 1007 the routine 1000 instructs the microcontroller 1205 to use the acquired profile from the engine speed range closest to or less than the current engine speed range n. In other words, use the previously acquired profile for the RANGE defined by the current state of the TEMP1 variable. This profile is from the current RPM range or from the next lowest RPM range for which a valid profile has been previously acquired. Then, routine 1000 is exited as follows. When the engine speed range n changes as sensed by routine 900, then routine 1000 is re-executed.

If a profile has not been acquired and processed for the engine speed range n, then step 1013 is executed. Then, in step 1013 the variable TEMP1 is tested to see if all engine speed ranges have been processed. If all engine speed ranges have not been processed, then steps 1005, 1013, and a step described next 1011 are iterated. In step 1011 the variable TEMP1 is decremented to point to the next lower engine speed range. If all engine speed ranges have been processed, then step 1015 is executed.

In step 1015 the microcontroller 1205 assumes that no profile has been acquired yet and the model is set to a null model by setting the correction factors for each encoder target for all engine speed ranges to 1 (no correction) and the routine 1000 is exited at step 1009.

Figure 11:
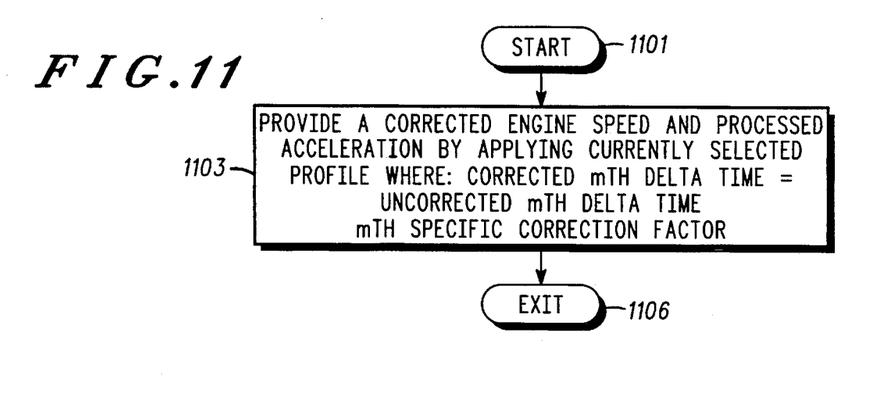
FIG. 11 is a flow chart showing various method steps in accordance with the preferred embodiment of the invention.
Figure 12:
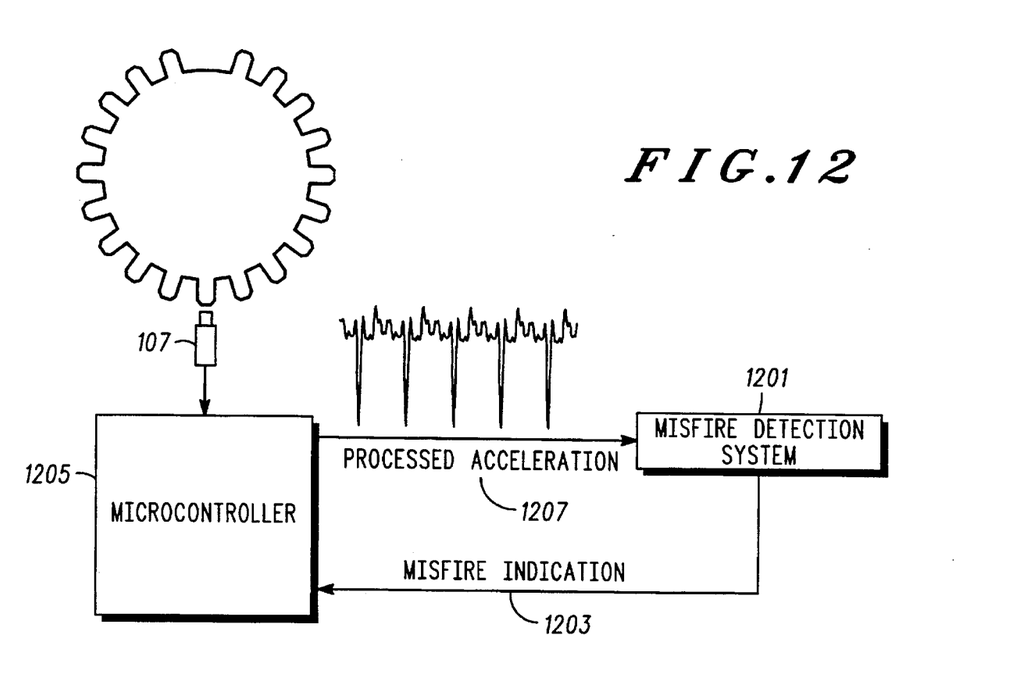
FIG. 12 is a system block diagram illustrating an apparatus for executing the preferred method.

FIG. 11 is a flow chart showing various method steps in accordance with the preferred embodiment of the invention. The routine runs continuously and commences at a step 1101. In step 1103 previously acquired profile correction factors are used to correct new incoming delta times caused by the encoder measurement process. As a new uncorrected delta time value becomes available, it is multiplied by the previously computed profile correction factor specific to that mth delta time associated with the encoder target. Then, step 1103 provides a corrected engine speed and processed acceleration by applying currently the selected encoder profile. The routine is exited at step 1105.

Processed acceleration is preferably calculated in two steps. First, angular velocity (V) over the specific delta time period (n) is obtained by executing the following deterministic equation on the microcontroller 1205.

EQUATION 3

$$V(n) = C_V / T_C(n).$$

where:

V=angular velocity n=delta time period index $T_c$=profile corrected delta time value $C_V$=velocity scaling constant Then, the processed acceleration for the delta time period (n) is calculated using the next equation:

EQUATION 4

$$\alpha(n) = [V(n) - V(n-1)] * V(n)$$

In conclusion, an improved approach for encoder profile correction for rotating position encoders in reciprocating engines has been detailed above. This new approach eliminates the various erroneous behaviors associated with such encoders over multiple engine speed ranges. This approach makes it possible to have more accurate misfire detection including misfire detection capability over a much wider engine operating speed range than prior art approaches.

What is claimed is:

1. A method of engine speed adaptive profile correction comprising the steps of:

determining a raw engine speed derived from a rotating position encoder driven by a reciprocating engine;

providing a first connected engine speed dependent on the raw engine speed and a predetermined first encoder profile, while the reciprocating engine is operating bounded within a first speed range;

providing a second corrected engine speed, dependent on the raw engine speed and a predetermined second encoder profile, while the reciprocating engine is operating bounded within a second speed range; and using both the first and second corrected engine speeds to obtain a corrected engine speed while the raw engine speed varies over both the first and second speed ranges.

2. A method in accordance with claim 1 wherein the predetermined first and second encoder profiles are acquired while the reciprocating engine is operating under fueled conditions.

3. A method in accordance with claim 1 wherein the predetermined first and second encoder profiles comprise a correction factor corresponding to each position of a multitude of positions indicated by the rotating position encoder and wherein the provided first and second corrected engine speeds are determined by factoring the raw engine speed by the first encoder profile while operating in the first speed range, and the second encoder profile while operating in the second speed range for each position of the multitude of positions by the corresponding correction factor.

4. A method in accordance with claim 3 wherein each correction factor corresponding to each position of the multitude of positions indicated by the rotating position encoder is determined dependent on an average of all of the raw engine speeds associated with each position of the multitude of positions indicated by the rotating position encoder bounded within one revolution of the rotating position encoder.

5. A method in accordance with claim 3 wherein each correction factor corresponding to each position of the multitude of positions indicated by the rotating position encoder is determined dependent on an average of all of the raw engine speeds associated with each position of a multitude of positions indicated by the rotating position encoder bounded within more than one revolution of the rotating position encoder.

6. A method in accordance with claim 3 wherein each correction factor corresponding to each position of the multitude of positions indicated by the rotating position encoder is determined dependent on an average of all of the raw engine speeds associated with each position of a multitude of positions indicated by the rotating position encoder bounded within more than one of the rotating position encoder.

7. A method in accordance with claim 1 wherein the predetermined first and second encoder profiles are generated using the following steps:

providing a normal-firing indication while the reciprocating engine is fueled and not misfiring;

measuring the speed of the reciprocating engine, while the reciprocating engine is operating bounded within the first speed range and while the normal-firing indication is provided, and generating the first encoder profile associated with the rotating position encoder dependent thereon; and measuring the speed of the reciprocating engine, while the reciprocating engine is operating bounded within the second speed range and while the normal-firing indication is provided, and generating the second encoder profile associated with the rotating position encoder dependent thereon.

8. A method in accordance with claim 7 wherein the normal-firing indication is determined dependent on a measurement of engine acceleration.

9. A method in accordance with claim 7 wherein the normal-firing indication is determined dependent on an engine speed corrected dependent on the predetermined first encoder profile while the second encoder profile is being measured.

10. A method in accordance with claim 7 further includes a step of determining that the reciprocating engine is not misfiring dependent on a measurement of engine acceleration.

11. A method in accordance with claim 10 wherein the step of determining that the reciprocating engine is not misfiring includes a step of determining that the reciprocating engine is not misfiring dependent on a measurement of engine acceleration altered by the predetermined first encoder profile.

12. A method of adaptive profile correction for a rotating position encoder in a reciprocating engine, the method comprising the steps of:

providing a normal-firing indication while the reciprocating engine is running under fueled conditions and not misfiring;

measuring the speed of the reciprocating engine while the normal-firing indication is provided and generating an encoder profile;

providing a corrected engine speed for the rotating position encoder dependent on the measured speed of the reciprocating engine and the generated encoder profile.

13. A method of engine speed adaptive profile correction for a rotating position encoder in a reciprocating engine, the method comprising the steps of:

providing a normal-firing indication while the reciprocating engine is running under fueled conditions and not misfiring;

measuring a raw engine speed, derived from a rotating position encoder driven by the reciprocating engine, while the normal-firing indication is provided and the reciprocating engine is operating bounded within in a first speed range, and generating a first encoder profile;

providing another normal-firing indication while the reciprocating engine is running under fueled conditions and not misfiring, the indication dependent on the generated first encoder profile;

measuring a raw engine speed, derived from the rotating position encoder driven by the reciprocating engine, while the another normal-firing indication is provided and the reciprocating engine is operating bounded within in a second speed range, and generating a second encoder profile dependent on the measured raw engine speed;

providing a corrected engine speed for the rotating position encoder dependent on the raw engine speed and one of the first encoder profile and the second encoder profile.

14. A method of engine speed adaptive encoder profile correction for a rotating position encoder in a reciprocating engine, the method comprising the steps of:

providing a normal-firing indication while the reciprocating engine is not misfiring;

measuring a speed of the reciprocating engine;

acquiring a first encoder profile dependent on the measured speed of the reciprocating engine while the reciprocating engine is operating bounded within a first speed range and the reciprocating engine is not misfiring per the provided indication;

storing the first encoder profile if the reciprocating engine exceeds the first speed range;

providing a first speed range profile corrected engine speed dependent on the measured speed of the reciprocating engine and the first encoder profile;

acquiring a second encoder profile dependent on the measured speed of the reciprocating engine while the reciprocating engine is operating bounded within a second speed range and the reciprocating engine is not misfiring per the provided indication;

storing the second encoder profile if the reciprocating engine exceeds the second speed range; and providing an encoder profile corrected engine speed for the rotating position encoder dependent on the measured speed of the reciprocating engine, and one of the first and second encoder profiles.

15. A method in accordance with claim 14 wherein the second speed range represents a higher engine speed than the first speed range.

* * * * *